Patented Dec. 13, 1949

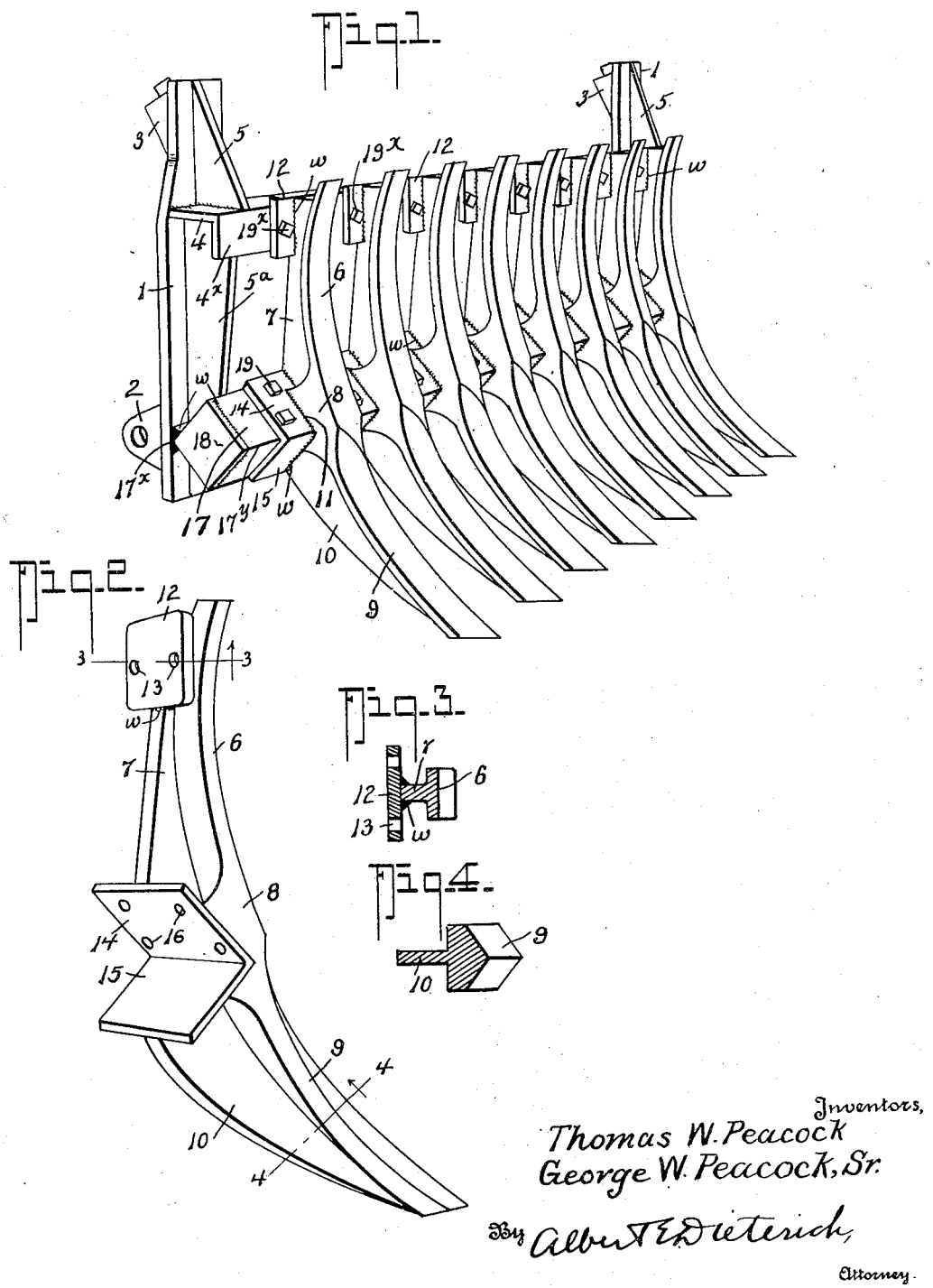

2,491,058

UNITED STATES PATENT OFFICE 2,491,058

ROOT RAKE

Thomas W. Peacock and George W. Peacock, Sr., Jacksonville, Fla., assignors of one-half to John E. Price, Jacksonville, Fla.

Application July 25, 1947, Serial No. 763,634

5 Claims. (Cl. 37—2)

The invention, which relates to root rakes or grubbers, has for its objects to improve the grubber disclosed in the application of John E. Price and Thomas W. Peacock, Serial No. 634,967, filed December 14, 1945, so as to enable a more successful and extended use of the same by cutting down breakage of the teeth and shearing of the mounting bolts.

To the attainment of the aforesaid objects, invention resides in the construction, combination and arrangement of parts hereinafter first fully described and then specifically pointed out in the appended claims, reference being had to the accompanying drawing in which:

Fig. 1 is a perspective view of the improved rake.

Fig. 2 is an enlarged perspective view of one tooth viewed from the rear.

Fig. 3 is a cross section on the line 3—3 of Fig. 2.

Fig. 4 is a cross section on the line 4—4 of Fig. 2.

In the drawing in which like numerals and letters of reference indicate like parts in all the figures, I represents the side posts or standards of the rake frame, 2 the ears for attachment to the pivoted yoke arms of a known tractor and 3 the members with which the lifting arms of the tractor are adapted to be connected. The side standards I have reinforcing ribs 5, 5ª on their front faces between which ribs an angle iron 4 is located and welded to each standard I and its ribs 5, 5ª at $w$. One part of the angle iron 4 lies parallel to the standards I, i. e., in a vertical position while the other part lies horizontal as best shown in Fig. 1.

Secured to the standards I adjacent their lower ends is a cross beam 17 composed of two angle irons welded together to constitute a tubular beam square in cross section. One edge of this beam is welded to the standards, see Fig. 1, the opposite edge being at the front. The beam is so positioned that a plane intersecting the front and back edges $17^x$, $17^y$ will lie horizontally.

Each tooth of the rake being of the same construction, a description of one will suffice. The tooth comprises an upper portion 6, an intermediate portion 8 and a lower portion 9. The upper and lower portions have strengthening ribs 7 and 10 respectively at the rear.

The intermediate portion, at the rear, has a right angled seat 11, the faces of which lie at approximately forty-five degrees to the horizontal so as to receive a mounting pad having two parts 14 and 15 which lie at right angles to each other. The upper part 14 is provided with bolt holes 16 for the bolts, with nuts 19, that secure the pad 14—15 to the beam 17 as shown in Fig. 1. Welded to the rib 7 at its upper end is a second or top mounting pad 12 composed of a flat plate to lie against the vertical face $4^x$ of the angle iron 4 to which the plate is secured by bolts and nuts $19^x$, the bolts passing through holes 13 in the plate 12 and through registering holes in the angle iron beam 4.

The ends of the beam 17 are closed by plates 18 welded in place to prevent dirt and moisture entering the beam.

Experience has shown that, with the construction shown in the aforesaid application Serial No. 634,967, the securing bolts sometimes shear off thereby permitting the teeth to drop off. This is especially true when the grubber is used in heavy growth. With the present construction we have found that the danger of shearing the attaching bolts has been entirely eliminated.

By providing the mounting pad 14, 15 and securing it integrally to the tooth proper the up thrust which, in the structure involved in the above application, was taken solely by the relatively short extension of the tooth below the lower transverse angle beam of the frame, is now taken in part by the intermediate portion of the body of the tooth and the remainder by the rib. As the pad 14, 15 is wider than the tooth several bolts 19 may be provided to hold the tooth to the beam 17. Likewise the provision of the mounting pad 12 which is wider than the body of the tooth allows for additional bolt protection.

From the foregoing description taken in connection with the accompanying drawing it is thought the construction, operation and advantages of the invention will be clear to those skilled in the art.

What we claim is:

1. A root rake comprising a supporting frame having uprights at the sides, an upper horizontal angle iron integrally secured to said uprights to lie in front of the same with one portion of the angle iron in a horizontal plane and the other portion of the same in a vertical plane, a tubular cross beam of a rectangular cross section having one edge integrally united to said uprights, at least one tooth having an L-shaped saddle intermediate its ends to fit said tubular cross beam, bolts with nuts passing through said saddle and said tubular beam and rigidly securing said saddle to said beam, said tooth adjacent its upper end having a pad to lie against said angle iron, and bolts and nuts securing said pad to said angle iron.

2. A root rake tooth composed of an upper portion, a lower portion and an intermediate portion, the intermediate portion having a seat on its rear face which seat is composed of two faces at right angles to each other and lying at approximately forty-five degrees to a vertical plane, said upper and lower portions each including a front face and a back rib, a flat mounting pad integrally secured to the back rib of the upper portion adjacent its upper extremity, and a mounting pad of two integral parts at right angles to each other integrally secured in the seat of said intermediate portion and to said back ribs.

3. A root rake tooth composed of an upper portion, a lower portion and an intermediate portion, the intermediate portion having a seat on its rear face which seat is composed of two faces at right angles to each other and lying at approximately forty-five degrees to a vertical plane, said upper and lower portions each including a front face and a back rib, a flat mounting pad integrally secured to the back rib of the upper portion adjacent its upper extremity, and a mounting pad of two integral parts at right angles to each other integrally secured in the seat of said intermediate portion and to said back ribs, combined with a frame having side standards, an upper angle beam with a vertical face and a lower beam of square cross section to receive and fit said two-faced mounting pad, said mounting pads being wider than the body of the tooth proper and each being provided with bolt holes, and bolts and nuts securing said pads respectively to said beams.

4. A root rake comprising a suporting frame having upright sides, an upper horizontal angle iron integrally secured to said uprights to lie in front of the same with one portion of the angle iron in a horizontal plane and the other portion of the same in a vertical plane, a cross beam of rectangular cross section the faces of which lie at an angle to the horizontal, one edge only of the cross beam being integrally united to said uprights at the front of the same, at least one tooth having an L-shaped saddle intermediate its ends to fit on the two front faces of said tubular cross beam, means passing through said saddle and into said cross beam rigidly securing said saddle to said cross beam, said tooth adjacent its upper end having a pad to lie against said angle iron, and means securing said pad to said angle iron.

5. A root rake comprising a supporting frame having upright sides, an upper horizontal angle iron integrally secured to said uprights to lie in front of the same with one portion of the angle iron in a horizontal plane and the other portion of the same in a vertical plane, a cross beam of rectangular cross section the faces of which lie at an angle to the horizontal, one edge only of the cross beam being integrally united to said uprights at the front of the same, at least one tooth having an L-shaped saddle intermediate its ends to fit on the two front faces of said tubular cross beam, means passing through said saddle and into said cross beam rigidly securing said saddle to said cross beam, said tooth adjacent its upper end having a pad to lie against said angle iron, and means securing said pad to said angle iron, said tooth having a back rib connecting said pad to the top of said saddle and having a second back rib connected to the bottom of said saddle and extending to approximately the bottom of said tooth.

THOMAS W. PEACOCK.
GEORGE W. PEACOCK, Sr.

REFERENCES CITED

The following references are of record in the file of this patent:

UNITED STATES PATENTS

| Number | Name | Date |
|---|---|---|
| 711,794 | Stein | Oct. 21, 1902 |
| 1,298,331 | Gould | Mar. 25, 1919 |
| 1,741,933 | Gunnison | Dec. 31, 1929 |
| 2,241,878 | Firstenberger et al. | May 13, 1941 |
| 2,371,549 | Sembler et al. | Mar. 13, 1945 |